Figure 3:
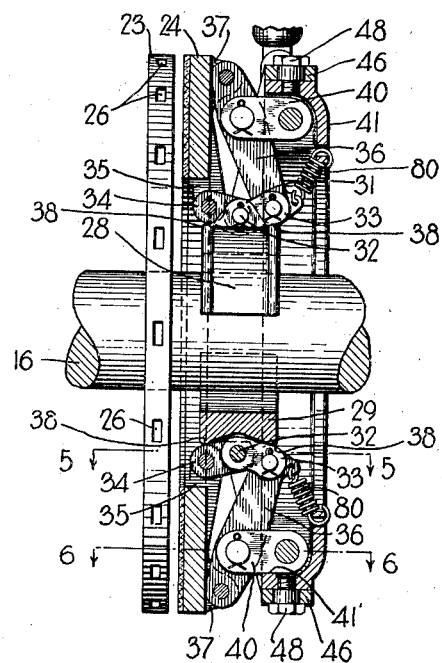

Sept. 26, 1939.   C. C. FARMER   2,174,401
VEHICLE BRAKE
Filed April 12, 1938    3 Sheets-Sheet 1
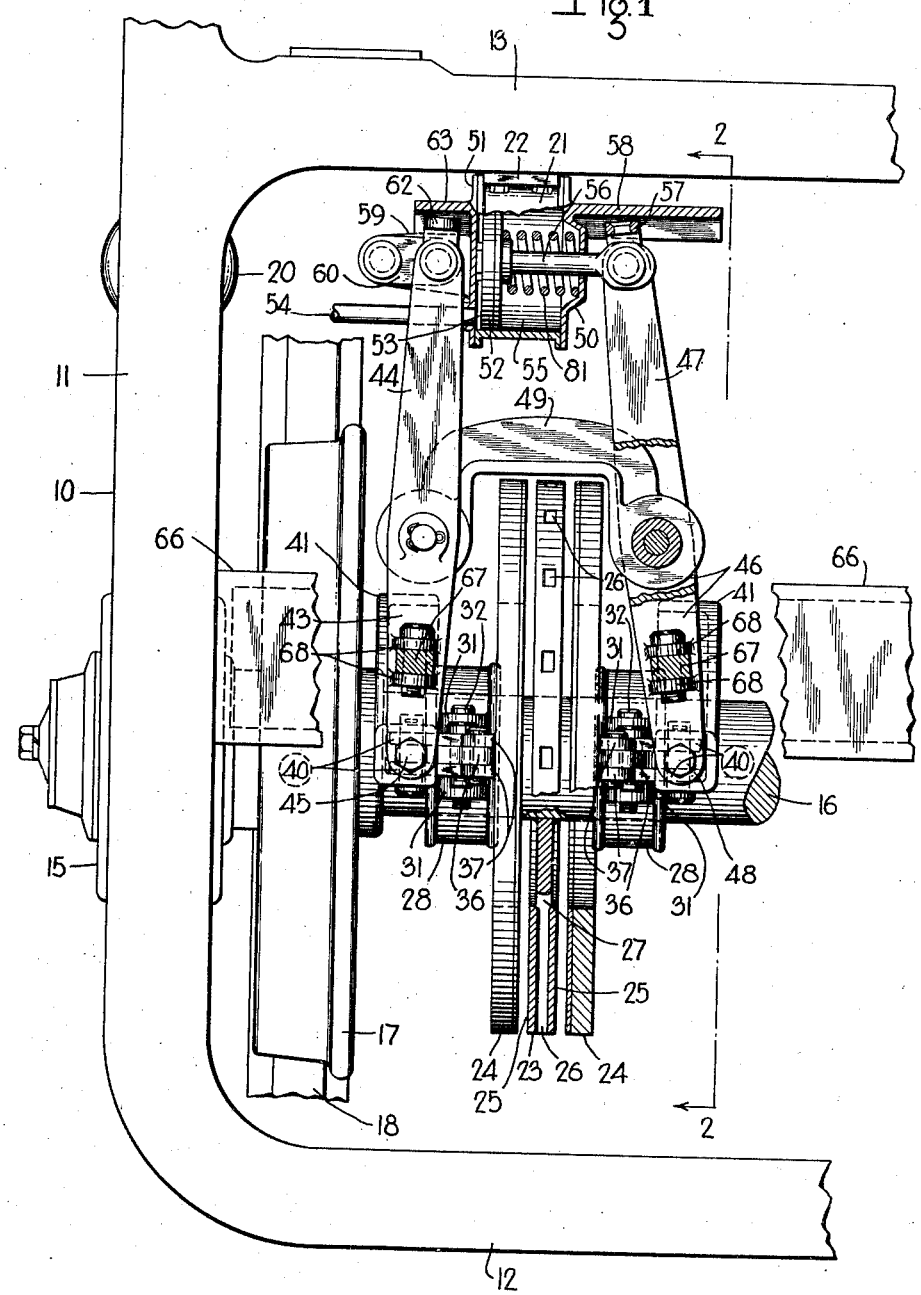
INVENTOR
CLYDE C. FARMER
BY
ATTORNEY Sept. 26, 1939.  C. C. FARMER  2,174,401
VEHICLE BRAKE
Filed April 12, 1938   3 Sheets-Sheet 2
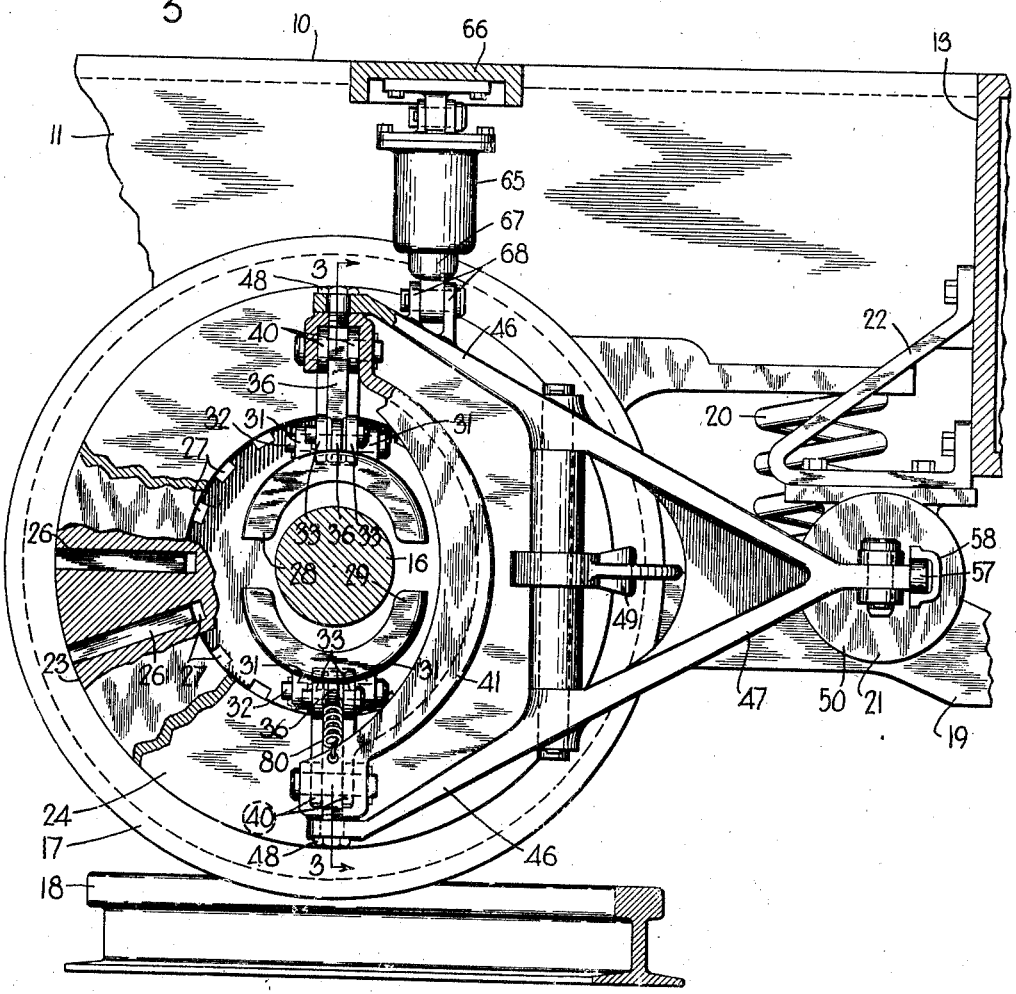
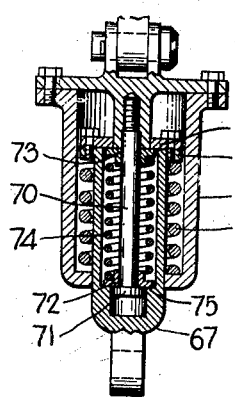
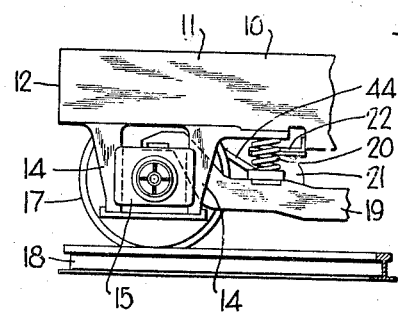
INVENTOR
CLYDE C. FARMER
BY
ATTORNEY Sept. 26, 1939.　　　　C. C. FARMER　　　　2,174,401
VEHICLE BRAKE
Filed April 12, 1938　　　3 Sheets—Sheet 3

INVENTOR
CLYDE C. FARMER
BY
ATTORNEY

Patented Sept. 26, 1939

2,174,401

UNITED STATES PATENT OFFICE 2,174,401

VEHICLE BRAKE

Clyde C. Farmer, Pittsburgh, Pa., assignor to The Westinghouse Air Brake Company, Wilmerding, Pa., a corporation of Pennsylvania Application April 12, 1938, Serial No. 201,520

39 Claims. (Cl. 188—59)

This invention relates to brake mechanism for vehicles and more particularly to the friction disk type for use on railway vehicle trucks.

Heretofore, brake mechanisms of the disk type proposed for use on railway vehicle trucks have usually been carried wholly either by the wheels or axle of the wheel and axle assemblies, thereby increasing to a greater than usual degree the dead or unsprung weight of the truck. This is undesirable, since any increase in the unsprung weight of the truck results in a corresponding increase in the pounding forces which occur between the truck wheels and track rails, due to inequalities, such as high or low spots, in either said wheels or rails and particularly such as may exist at the joints between rails. Any increase in these pounding forces in turn results in a corresponding increase in wear or damage to the wheels and rails and to parts of the truck carried by the wheels and to parts of the vehicle carried by the truck.

One object of the present invention is therefore to provide an improved disk brake mechanism, particularly adapted for railway vehicle trucks, in which the major portion of the weight of the mechanism is carried by the truck frame as sprung weight, so as to thereby avoid excessive wear of or damage to track rails, truck wheels or other parts of the vehicle, such as above described.

According to this object the only portion of the brake mechanism carried by the truck wheels as unsprung weight is the annular rotatable element or elements to be braked, all other parts of the brake mechanism including annular non-rotatable elements, which are provided for frictionally engaging and thereby braking said rotatable elements, being carried by the truck frame which is resiliently carried by the truck wheels, through the medium of the usual truck springs.

The truck frame being resiliently carried by the truck wheels is capable of movement relative to the wheels in a vertical direction and will therefore at different times or under various conditions assume different vertical positions with respect to said wheels, which movement may be due for instance to the passage of the trucks over uneven track or more particularly to different degrees of load in the vehicle supported by the truck. It will therefore be evident that since the non-rotatable brake elements of the brake mechanism are carried by the truck frame they also will assume various eccentric positions with respect to the rotatable elements carried by the truck wheels. It is however desired that the non-rotatable elements be in concentric relation with the rotatable elements when pressed into frictional braking engagement therewith.

Another object of the invention is therefore to provide an improved disk brake mechanism such as above described embodying means for moving the non-rotatable elements relative to the truck frame into concentric braking relationship with the rotatable elements carried by the wheels at the time said elements are pressed into frictional engagement for braking said wheels.

A still further object of the invention is to provide improved means for dissipating heat generated in the annular braking elements incident to frictional braking engagement between said elements.

Other objects and advantages will be apparent from the following more detailed description of the invention.

Figure 4:
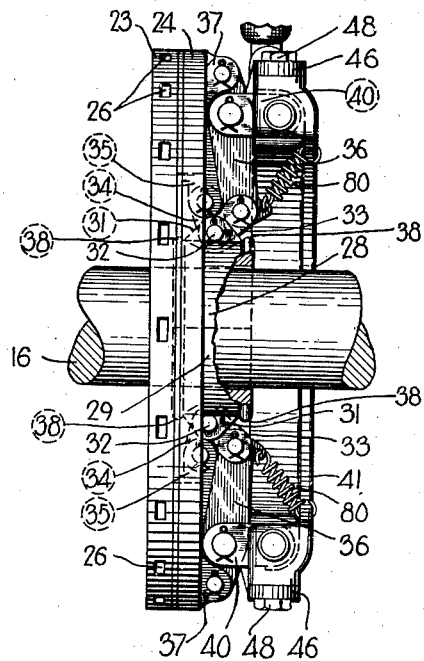
Figure 5:
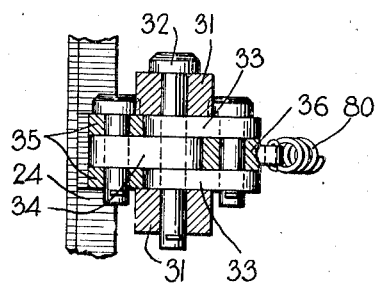
Figure 6:
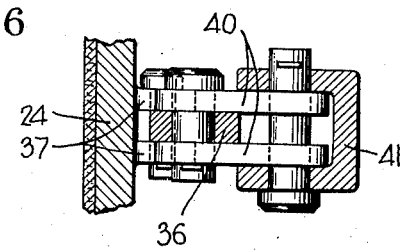

In the accompanying drawings Fig. 1 is a plan view, partly in section, of a portion of one end and one side of a vehicle truck embodying the invention; Fig. 2 is a sectional view taken on the line 2—2 in Fig. 1; Fig. 3 is a sectional view taken on the line 3—3 in Fig. 2; Fig. 4 is a view similar to Fig. 3 but showing certain parts in a different position; Figs. 5 and 6 are plan views, with certain parts shown in section, of lever and link arrangements embodied in the invention, these views being taken substantially on the lines 5—5 and 6—6 in Fig. 3 and being at a somewhat enlarged scale; Fig. 7 is an enlarged sectional view of an element shown in Fig. 2; and Fig. 8 is a side view, on a reduced scale, of a portion of the vehicle truck with which the invention is associated.

As shown in the drawings the improved disk brake mechanism is applied to a vehicle truck which for the purpose of illustration comprises a truck frame 10 of the cast type having spaced side members 11 connected together by the usual transversely extending end members 12 and transoms 13.

The side members 11 are provided with the usual spaced pedestals 14 slidably mounted on journal boxes 15 in which the ends of an axle 16 are journaled. A pair of oppositely disposed wheels 17 are keyed or otherwise rigidly secured to axle 16 in the usual spaced relation for rolling on rails 18. An equalizer bar 19 is provided at each of the opposite sides of the truck and is carried by the journal boxes 15. These equalizer bars carry springs 20 upon which the frame 10 is resiliently supported.

Only a portion of one end and one side of the vehicle truck is shown in the drawings and therefore only portions of the elements above described are shown, the showing being deemed sufficient to a clear understanding of the invention.

One or more disk brake mechanisms constructed in accordance with the invention may be employed for braking each pair of wheels 17. In the drawings only one such mechanism is shown but it will be understood that if an additional mechanism is to be used it may be identical in every respect with the mechanism shown.

The mechanism as shown may comprise a brake cylinder device 21 which may be carried by any suitable portion of the truck frame such as a bracket 22 secured to the transom 13, and may also comprise an annular, rotatable, friction disk braking element 23 secured concentrically to axle 16 in any desired manner, such as by welding, so as to rotate with the wheels 17, and a pair of oppositely disposed like, annular, non-rotatable friction braking elements 24 encircling the axle 16 and disposed one at either side of the rotatable element 23.

The rotatable element 23 is provided with oppositely disposed friction faces 25 adapted to be frictionally engaged by the non-rotatable elements 24 for effecting braking of the wheels 17 in a manner to be hereinafter described. The rotatable element 23 is also provided with a plurality of spaced, radially arranged air conducting passages 26 between the friction faces 25 and extending from the outer periphery of the element to cross passages 27 provided through said element in the portion between said friction faces and the axle 16.

A substantially semi-circular shoe 28 is disposed directly above the axle 16 adjacent the outer face of each of the non-rotatable elements 24 and is provided with an inner curved surface formed on a radius slightly greater than that of the axle 16. A like, oppositely disposed shoe 29 is disposed at the lower side of axle 16 opposite each of the upper shoes 28. Each pair of shoes 28 and 29 are normally spaced from each other above and below axle 16 as shown in Figs. 2 and 3 of the drawings, but are adapted to be moved toward said axle into engagement with each other, as shown in Fig. 4, in which position they are adapted to form, in effect, a ring encircling said axle and having a free running fit thereon.

Each of the shoes 28 and 29 is provided on its outer face with a pair of spaced lugs 31 equally spaced from the ends of the shoe and carrying a pivot pin 32 on which is pivotally mounted one end of three relatively short levers, two outside levers 33 and a central lever 34. The other end of each of the levers 34 is pivotally connected to a pair of spaced lugs 35 provided on the adjacent non-rotatable element 24 near the inner periphery thereof, while the other end of each of the levers 33 is pivotally connected to one end of a lever 36 disposed to turn in a substantially vertical plane. The other end of each of the levers 36 is pivotally connected to lugs 37 provided near the outer periphery on the adjacent non-rotatable element 24.

There is thus provided above the axle 16 and adjacent the outer face of each of the non-rotatable element 24, the shoe 28 and the levers 34, 33 and 36 connecting said shoe to spaced lugs on said non-rotatable element, while below said axle and adjacent the outer face of each of the non-rotatable elements 24 there is provided the oppositely disposed shoe 29 and an oppositely disposed like system of levers connecting shoe 29 to spaced lugs on the non-rotatable element 24, the lugs on the non-rotatable elements above the said axle being diametrically opposite those below the axle.

In Fig. 3 of the drawings each oppositely disposed pair of shoe 28 and 29 are shown disengaged from each other and spaced from the axle 16, which is the position said shoes assume when the brakes on the vehicle are released. This release position of each pair of shoes 28 and 29 is defined by the engagement of spaced shoulders 38, provided at the opposite ends of lugs 31, with the lugs 35 on the non-rotatable elements 24 and with the ends of the levers 36.

In order that the shoes 28 and 29 will assume this release position it is essential that the levers 36 be turned about the lugs 37 in a direction away from the adjacent non-rotatable element 24, and this movement acts to permit the outer ends of the levers 33 and 34 to move apart for thereby drawing the connected shoe to its release position in which it is spaced from axle 16. A spring 80 is connected to each of the levers 36 for turning same to its release position.

With the shoes 28 and 29 in their release position and thus spaced from axle 16 it will be noted that the associated non-rotatable elements 24 are free to move in a vertical direction relative to the axle 16 and rotatable element 23, for reasons which will be later apparent.

When an application of the brakes is effected, as will be later described, the inner ends of the levers 36 are adapted to be moved from the position shown in Fig. 3 of the drawings in the direction toward the connected non-rotatable elements 24 and this movement acting through the levers 33 is adapted to move the connected shoes 28 and 29 in the direction toward axle 16 and into engagement with each other in a position in which said shoes are in substantial concentric relationship with the non-rotatable elements 24. Movement of the shoes 28 and 29 past this position is prevented in any suitable manner, as by means of engagement between levers 36 and 34. Due to this engagement of levers 34 and 36 it should be noted that none of the shoes can move past the position in concentric relationship with the rotatable elements even though one shoe should obtain this position ahead of the opposite shoe.

In Fig. 3 of the drawings the non-rotatable elements 24 are shown in concentric relationship with the rotatable element 23, and the shoes 28 and 29 are moved away from axle 16. This is a position which the non-rotatable elements will assume when the vehicle carried by the truck is substantially half loaded. The non-rotatable elements 24 are adapted to be supported from the truck frame 10, by means which will be later described, and will therefore move with the truck frame when the brakes are released. As a result, if the vehicle carried by the truck is empty, the truck frame will be in its most elevated position with respect to wheels 17 and the non-rotatable elements 24 will therefore be raised to a position in which their upper peripheral surfaces will be above that of the rotatable element 23, while in case the vehicle carried by the truck is fully loaded, the non-rotatable elements 24 will be in a position in which their lower peripheral surfaces are below that of the rotatable element 23. It will therefore be apparent that the non-rotatable elements will assume, when the brakes are released, various positions eccentric to the rotatable element 23, as well as the concentric position shown in the drawings.

If the non-rotatable elements 24 are in concentric relationship with the rotatable element 23 at the time the inner ends of levers 36 are moved toward the connected non-rotatable elements 24, the shoes 28 and 29 will be merely moved toward and into engagement with each other, this engagement being obtained at substantially the time they move into concentric relationship with the axle 16.

However, in case the non-rotatable elements 24 are in eccentric relationship to the rotatable element 23 at the time the inner ends of the levers 36 are moved toward the connected non-rotatable element, the shoes 28 or 29, initially most remote from axle 16, will be promptly moved to the position in concentric relationship with the non-rotatable element as defined by engagement of the operating levers 36 and 34. The other shoes, initially closest to axle 16, will however be moved into engagement with axle 16 upon slight movement of the connected levers 36 toward the non-rotatable elements. Upon engagement of these other shoes with axle 16, said shoes act upon further movement of the connected levers 36 toward the non-rotatable elements, to cause the outer ends of said levers and thereby the connected non-rotatable elements to move relative to the rotatable elements 23, and this relative movement will continue until the shoes, initially most remote from the axle, are pulled into engagement with the opposite shoes. When the shoes 28 and 29 are thus pulled into engagement with each other, the non-rotatable elements 24 will be in substantial concentric relationship with the rotatable element 23.

Regardless of the eccentric position which the non-rotatable elements 24 may be in with respect to the rotatable element 23 at the time the brakes are released, the operation of the levers 36 and shoes 28 and 29 at the time an application of the brakes is initiated, will move said non-rotatable elements into concentric relationship with the rotatable element 23, in the manner above described. After the ends of the opposite shoes 28 and 29 are moved into engagement with each other they are forced against each other by pressure applied to levers 36 in a manner to be later described, for securely holding the non-rotatable elements 24 in concentric relationship with the rotatable element 23.

It is desired to point out that the opposite ends of the shoes 28 and 29 engage to prevent binding between said shoes and axle 16, it being intended that there be a free running fit between said shoes and axle under this condition.

Each of the levers 36 is pivotally connected intermediate its ends to one end of a pair of links 40 the opposite ends of each oppositely disposed pair of said links being pivotally connected to the opposite ends of a substantially semi-circular strut-like element 41 extending around one side of the axle 16. Each of the elements 41 is preferably right angular in cross-section for rigidity and is provided in its lowermost portion with a shoulder 41' for engagement with the lower edges of the adjacent links 40 through the medium of which the non-rotatable elements 24 are adapted to be supported from the elements 41. It is desired to here point out that the release springs 80 for levers 36 are anchored to elements 41.

The strut-like elements 41 closest to the wheel 17 is pivotally connected at its ends to the legs 43 of a bifurcated arm or brake lever 44 through the medium of diametrically opposite, vertically disposed pivot pins 45 secured in said element, while the other strut-like element 41 is pivotally connected at its ends to legs 46 of an oppositely disposed and like bifurcated arm or brake lever 47 through the medium of diametrically opposite, vertically arranged pivot pins 48 secured in the element.

The opposite or closed ends of the brake levers 44 and 47 are adapted to be connected to the brake cylinder device 21, while a tie rod 49 is provided connecting said levers intermediate their ends. It will be noted from Fig. 1 of the drawings that the tie-rod 49 is a substantially U-shaped structure straddling the rotatable and non-rotatable elements 23 and 24 and connected to the levers 44 and 47 closer to the axle 16 than the periphery of said elements.

The brake cylinder device 21 is arranged to work in a direction transversely of the truck and may comprise a casing having on one end a non-pressure head 50 and on the opposite end a pressure head 51 and containing a piston 52. The piston 52 has at one side a pressure chamber 53 to which there is connected a pipe 54 through which fluid under pressure is adapted to be supplied to and released from said chamber in any desired manner for controlling the brakes on the vehicle. The piston 52 has at the opposite side a chamber 55 which may be in communication with the atmosphere in the usual manner and which contains a release spring 81 for moving said piston to its release position, as shown in Fig. 1. The piston 52 is provided with a rod 56 extending through the chamber 55 and a suitable bore in the non-pressure head 50, and the outer end of said rod is pivotally connected to the adjacent end of brake lever 47.

A roller 57 is provided on the end of lever 47 and is disposed to operate between the side walls of a channel shaped extension 58 projecting from the non-pressure head 50, the diameter of said roller being slightly less than the space between said side walls in order to avoid the setting up of any binding action between said roller and walls.

The pressure head 51 is provided with an extension or lug 59 to the end of which is pivotally connected one end of a link 60. The other end of the link 60 is pivotally connected to the adjacent end of the brake lever 44. A roller 62 is provided on the end of lever 44 and is disposed between the side walls of a channel shaped portion 63 of the lug 59, clearance being provided between the periphery of said roller and the side walls of said channel in order to avoid the setting up of any binding action between the roller 62 and lug 59.

From the above description it will be evident that the ends of the levers 44 and 47 which are connected to the brake cylinder device 21 are supported from the truck frame 10 through the medium of the brake cylinder device 21 mounted on the transom 13. The opposite ends of the levers 44 and 47, the strut like elements 41, the shoes 28 and 29, the non-rotatable elements 24 and the link arrangement connecting said shoes and non-rotatable element are also normally supported from any suitable portion of the truck frame through the medium of resilient supporting devices 65, each of which is connected to each of said levers adjacent its connection with the strut like element 41.

Each of the spring supporting devices 65 comprises a casing pivotally connected at its upper end to any desired portion of the truck frame, such as an element 66 which may extend between and be secured at its opposite ends to the side frames 11.

Slidably mounted in the casing of each of the devices 65 and extending through the lower end thereof is a plunger 67 the lower end of which is pivotally connected to a pair of spaced lugs 68 on the topmost leg of the adjacent brake lever.

In the casing the plunger 67 is provided with an enlarged head portion 67' between which and the lower end of the casing there is interposed a spring 69 acting upwardly on the plunger 68 with a force just sufficient to normally counterbalance the weight of the connected non-rotatable element 24 and other associated parts of the mechanism.

The plunger 67 is provided with an axial bore in which there is disposed a pin 70 secured at its upper end to the casing of the device and having at its lower end a head 71. A pair of oppositely disposed spring seats 72 and 73 are slidably mounted on the pin 70, and between said seats and encircling said pin is a coil spring 74. A shoulder 75 is provided in the bore in plunger 67 adjacent the bottom of said bore for engagement by the spring seat 72 while the spring seat 73 is normally adapted to engage the end of a depending portion of the casing in which the pin 70 is secured.

The parts of the device 65 are shown in the drawings in the positions normally assumed when the brakes are released, it being noted that with the spring seats 72 and 73 in the positions shown, the spring 74 in each device is held confined between said seats, which are in their outermost position, whereby said spring is inactive.

Each of the springs 74 is provided to dampen vibration or oscillation of the connected parts of the brake mechanism, including the non-rotatable element 24, which are carried by the device 65, incident to roughness of the track upon which the wheels 17 roll.

In case due to roughness or for any other reason the parts carried by the spring devices 65 tend to move upwardly relative to the truck frame the plungers 67 in said devices are urged inwardly of the casings. This movement of the plungers 67 is relative to the pins 70 and therefore acts to pick up spring seats 72 and compress the springs 74. The springs 74 are however secured between the spring seats 72 and 73 under a certain predetermined pressure which it is intended will immediately dampen any such movement of plungers 67 and return said plungers and parts supported thereby to their normal position.

The springs 74 are adapted to act in the same manner as just described in case the parts of the brake mechanism tend to move downwardly relative to the truck frame 19. In order that the springs 74 will act under this condition there is secured to the inner end of each of the plungers 67, a plate 76 having a bore of smaller diameter than that in said plunger so as to thereby provide a shoulder for engagement with the spring seats 73, whereby upon movement of plungers 67 in a downwardly direction the plates 76 will move against and thereby compress the springs 74, so that said springs will act to dampen such movement and return the parts of the mechanism to their normal position as shown.

It will now be noted that through the medium of the spring supporting devices 65 the non-rotatable elements 24, the elements 41, the shoes 28 and 29 and the leverage mechanism connecting said shoes to said non-rotatable elements, and the adjacent end of the brake levers 44 and 47 are adapted to move with the truck frame 10 when said shoes are in the position shown in Fig. 3 of the drawings, that is, at all times when the brakes on the vehicle truck are released. It will therefore be evident that with the brakes released the only part of the brake mechanism carried by the axle 16 is the rotatable element 23.

In operation, let it be assumed that the parts of the brake mechanism are in the position shown in Figs. 1, 2 and 3 of the drawings in which the brakes on the truck are released, and let it further be assumed that the truck is rolling along the track rails 18 and that it is desired to stop rotation of the wheels 17, or in other words it is desired to brake the truck.

In order to effect an application of the brakes on the truck, fluid under pressure is supplied to the pipe 54 in any desired manner, such as by the operation of a conventional type of triple valve device or the like (not shown). Fluid under pressure thus supplied to pipe 54 flows to chamber 53 and therein acts on the brake cylinder piston 52 to move said piston and thereby the rod 56 outwardly of the brake cylinder in the direction of the right hand as viewed in Fig. 1 of the drawings.

This movement of the piston rod 56 acts to rock the lever 47 in a clockwise direction about its pivotal connection with the connecting link 49 and through said link acts to rock the lever 44 in a counterclockwise direction about its pivotal connection with the link 60 connected to the brake cylinder device 21. As a result, the ends of legs 43 and 46 of the two levers 44 and 47 are moved toward each other and act through the strut-like members 41, links 40 and levers 36 to move the non-rotatable elements 24 toward and into engagement with the rotatable element 23.

During this movement the springs 80 hold the levers 36, 33 and 34 in the position shown in Fig. 3. However as soon as the non-rotatable elements 24 engage the rotatable element 23, said non-rotatable elements offer such resistance to further movement that continued movement of the levers 47 and 44, strut-like elements 41 and links 40 in the direction toward the non-rotatable elements then acts to rock the levers 36 toward said elements and thereby operate the levers 33 and 34 to move the centralizing shoes 28 and 29 into engagement with each other for thereby pulling the non-rotatable elements into concentric cooperative relation with the rotatable element 23, as hereinbefore described.

After the non-rotatable elements 24 are thus moved into concentric relation with the rotatable element 23, the engagement of the shoes 28 and 29 prevents further movement of the levers 36 in the direction of the non-rotatable elements, so that further pressure applied by the brake cylinder 21 through the brake levers 44 and 47, elements 41 and links 40 to the levers 36 then acts to force the non-rotatable elements 24 into frictional engagement with the rotatable element 23 for braking said rotatable element and thereby the connected wheels 17. The degree of pressure with which the non-rotatable elements 24 are forced against the rotatable element 23 may be varied as desired by varying the pressure of fluid supplied to chamber 53 for acting on the brake cylinder piston 52, in the usual manner, so that any desired degree of braking or rate of retardation of wheels 17 may be obtained.

From the above description it will be noted that in effecting an application of the brakes the non-rotatable elements are moved into engagement with the rotatable element before said non-rotatable elements are centralized with respect to said rotatable element, but the force required between said elements to effect operation of the centralizing mechanism is relatively small and not sufficient to effect any material degree of braking.

It will also be noted that movement of the non-rotatable elements 24 to their centralized position is opposed by either one or both of the springs 69 and 74 in the spring supporting devices 65. This is however immaterial to this operation, the only function of these springs being as hereinbefore described.

When the brakes are applied the non-rotatable elements 24 are held against rotation with the rotatable element 23 by the brake levers 44 and 47, the outer ends of which are disposed between and supported by one or the other of the side walls of the channel shaped extensions 63 and 58 on the brake cylinder device 21, according to the direction of rotation of the rotatable element 23. The rollers 57 and 62 on the outer ends of said levers are provided to facilitate relatively free movement of said ends of said levers in the brake cylinder extensions 58 and 63 as said levers are moved therein while holding the non-rotatable elements against rotation.

It will be noted that when the brakes are applied the strut like elements 41 act to hold the associated lever arms 43 and 46 against spreading or collapse, as otherwise might occur due to the use of links 40 in the operating connection between said arms and the levers 36.

In order to effect a release of the brakes after an application fluid under pressure is vented from pipe 54 and thereby from the brake cylinder piston chamber 53, whereupon the release spring 81 acting on the brake cylinder piston 52 moves said piston to the release position. This movement of the piston 52 acts through the rod 56 to draw the connected end of the brake lever 47 toward the brake cylinder device thereby rocking said lever in a counterclockwise direction and through the medium of the connecting link 49 rocking the lever 44 in a clockwise direction. The ends of the levers 47 and 44 adjacent the non-rotatable elements 24 are thereby moved apart relieving the pressure on the links 40 and thereby the pressure between the non-rotatable elements 24 and the rotatable element 23, following which the springs 80 act to pull the inner ends of the levers 36 in a direction away from the adjacent non-rotatable elements 24. This movement of the levers 36 acts through the levers 33 and 34 to draw the shoes 28 and 29 away from the axle 16 until the movement of the levers 36 is arrested by the engagement of said shoes with the ends of the adjacent lugs 35 and levers 33.

As the shoes 28 and 29 are thus drawn away from the axle 16 the spring supporting devices 65 act, through the medium of the levers 44 and 47 to return the non-rotatable elements 24 to their normal position in which the weight thereof and the weight of the mechanism connecting said elements to said levers is again supported from the truck frame 10 through the medium of the supporting devices 65. It will be noted that when the non-rotatable elements are thus pulled out of engagement with the rotatable element 23 the weight of each of the non-rotatable elements is supported by the lower link 40 which engages the shoulders 41 in the adjacent strut element 41.

From the above description it will be noted that at no time is the axle 16 subjected to the unsprung weight of the non-rotatable elements 24, the brake elevers 44 and 47 and the mechanism connecting said elements and levers together. The axle 16 merely carries the weight of the rotatable element 23 and during braking is subjected to the pressure from either the upper or lower shoes 28 or 29 as required to move the non-rotatable elements 24 into concentric relation with the rotatable element 23 against the opposing pressure of one or both of the springs 69 and 74 in the resilient supporting devices 65.

While the rotatable element 23 is rotating, air is caused to flow in the direction through the passages 27 and from thence through the passages or ducts 26 located between the friction faces 25 of said element, and it will be evident that this flow of air will carry away or dissipate heat from said element incident to the frictional braking engagement thereof by the non-rotatable elements 24 and thus prevent undue heating of the rotatable element during braking.

While one illustrative embodiment of the invention has been described in detail it is not the intention to limit the scope to this embodiment or otherwise than by the terms of the appended claims.

Having now described my invention, what I claim as new and desire to secure by Letters Patent, is:

1. A brake mechanism for a vehicle having wheels and a truck frame resiliently carried by said wheels, said mechanism comprising annular rotatable and non-rotatable friction braking disks adapted upon frictional interengagement to effect braking of at least one of said wheels, the rotatable disk being secured to rotate with the wheel to be braked, means carried by said frame for normally supporting said non-rotatable disk for movement with said frame relative to said rotatable disk, and means associated with said non-rotatable disk operative upon frictional engagement between said disks to move said non-rotatable disk relative to said frame into concentric braking relationship with said rotatable disk.

2. A brake mechanism for a vehicle having wheels and a truck frame resiliently carried by said wheels, said mechanism comprising annular rotatable and non-rotatable friction braking disks adapted upon frictional interengagement to effect braking of at least one of said wheels, the rotatable disk being secured to rotate with the wheel to be braked, means carried by said frame for normally supporting said non-rotatable disk for movement with said frame relative to said rotatable disk, and means associated with said non-rotatable disk operative upon frictional engagement between said disks to maintain said non-rotatable disk in concentric braking relationship with said rotatable disk.

3. A brake mechanism for a vehicle having wheels and a truck frame resiliently carried by said wheels, said mechanism comprising annular rotatable and non-rotatable friction braking elements adapted upon frictional interengagement to effect braking of at least one of said wheels, said rotatable element being secured to rotate with at least the one wheel, adjustable means carried by said frame for normally supporting said non-rotatable element for movement with said frame relative to said rotatable element, and mechanism associated with said non-rotatable element operative upon frictional engagement between said elements to move said non-rotatable element relative to said frame into concentric braking relation with said rotatable element.

4. A brake mechanism for a vehicle having wheels and a truck frame resiliently carried by said wheels, said mechanism comprising annular rotatable and non-rotatable friction braking elements, said rotatable element being secured to rotate with one of said wheels, means carried by said frame for normally supporting said non-rotatable element for movement with said frame relative to said rotatable element and operative to permit movement of said non-rotatable element relative to said frame into concentric braking relation with said rotatable element, means for moving said non-rotatable element into frictional engagement with said rotatable element to effect braking of said wheel, and mechanism associated with said non-rotatable element operative upon engagement of said non-rotatable element with said rotatable element to effect movement of said non-rotatable element into concentric braking relation with said rotatable element.

5. A brake mechanism for a vehicle having wheels and a truck frame resiliently carried by said wheels, said mechanism comprising annular rotatable and non-rotatable friction braking elements, said rotatable element being secured to rotate with one of said wheels, means carried by said frame for normally supporting said non-rotatable element for movement with said frame relative to said rotatable element and operative to permit movement of said non-rotatable element relative to said frame into concentric braking relation with said rotatable element, means for moving said non-rotatable element into frictional engagement with said rotatable element to effect braking of said wheel, a member secured in concentric relation with said rotatable element, and mechanism cooperative with said member in effecting an application of the brakes to effect movement of said non-rotatable element relative to said frame into concentric braking relation with said rotatable element.

6. A brake mechanism for a vehicle having wheels and a truck frame resiliently carried by said wheels, said mechanism comprising annular rotatable and non-rotatable friction braking elements, said rotatable element being secured to rotate with one of said wheels, means carried by said frame for normally supporting said non-rotatable element for movement with said frame relative to said rotatable element and operative to permit movement of said non-rotatable element relative to said frame into concentric braking relation with said rotatable element, means for moving said non-rotatable element into frictional engagement with said rotatable element to effect braking of said wheel, a member secured in concentric relation with said rotatable element, and means associated with said non-rotatable element and cooperative with said member in effecting an application of the brakes to move said non-rotatable element relative to said frame into concentric braking relation with said rotatable element.

7. A brake mechanism for a vehicle having wheels and a truck frame resiliently carried by said wheels, said mechanism comprising annular rotatable and non-rotatable friction braking elements, said rotatable element being secured to rotate with one of said wheels, means carried by said frame for normally supporting said non-rotatable element for movement with said frame relative to said rotatable element and operative to permit movement of said non-rotatable element relative to said frame into concentric braking relation with said rotatale element, a member secured in concentric relation with said rotatable element, mechanism associated with said non-rotatable element and cooperative with said member to move said non-rotatable element relative to said frame into concentric braking relation with said rotatable element, and means connected to said mechanism and operative in effecting an application of the brakes to first effect the operation of said mechanism to move said non-rotatable element into concentric braking relation with said rotatable element and to then urge said elements into braking engagement for braking said wheel.

8. A brake mechanism for a vehicle having wheels and a truck frame resiliently carried by said wheels, said mechanism comprising annular rotatable and non-rotatable friction braking elements, said rotatable element being secured to rotate with one of said wheels, means carried by said frame for normally supporting said non-rotatable element for movement with said frame relative to said rotatable element and operative to permit movement of said non-rotatable element relative to said frame into concentric braking relation with said rotatable element, a member secured in concentric relation with said rotatable element, mechanism associated with said non-rotatable element and member operative upon engagement of said elements to effect movement of said non-rotatable element relative to said frame into concentric braking relation with said rotatable element, and means for moving said elements into engagement for effecting the operation of said mechanism and for effecting braking of said wheel.

9. A brake mechanism for a vehicle having wheels and a truck frame resiliently carried by said wheels, said mechanism comprising a circular member secured concentrically to one of said wheels for rotation therewith, an annular friction braking element secured concentrically to said member for rotation therewith, an annular non-rotatable friction braking element, adjustable means carried by said frame for normally supporting said non-rotatable element from said frame for movement therewith and operative to permit movement of said non-rotatable element relative to said frame into concentric braking relation with said rotatable element, mechanism associated with said non-rotatable element and adapted to cooperate with said circular member for moving said non-rotatable element relative to said frame into concentric relation with said rotatable element and also operative to urge said elements into braking engagement, and a brake cylinder device connected to said mechanism for controlling the operation thereof.

10. A brake mechanism for a vehicle truck having wheels, and a truck frame resiliently carried by said wheels, said mechanism comprising an annular rotatable friction braking element secured to rotate with one of said wheels, an annular non-rotatable friction braking element adapted to cooperate with said rotatable element to brake the wheel, adjustable means carried by said frame for normally supporting said non-rotatable element for movement with said frame and operative to permit movement of said non-rotatable element relative to said frame, mechanism for moving said non-rotatable element relative to said frame, means for arresting movement of said non-rotatable element relative to said frame in a position concentric with said rotatable element, and means for controlling the operation of the last named mechanism.

11. A brake mechanism for a vehicle truck having wheels, and a truck frame resiliently carried by said wheels, said mechanism comprising an annular rotatable friction braking element secured to rotate with one of said wheels, an annular non-rotatable friction braking element adapted to cooperate with said rotatable element to brake the wheel, adjustable means carried by said frame for normally supporting said non-rotatable element for movement with said frame and operative to permit movement of said non-rotatable element relative to said frame, a circular element associated concentrically with one of said wheels, a shoe disposed above said circular element, a diametrically opposite shoe below said circular element, lever means connecting said shoes and non-rotatable element operative upon movement in one direction to draw said shoes away from said circular element and in the opposite direction to urge said shoes toward said circular element, means for limiting the movement of each of said shoes toward said circular element to such a degree that, with the shoes engaging said circular element, said non-rotatable element is in concentric relation with said rotatable element, and means for controlling the operation of said lever means.

12. A brake mechanism for a vehicle truck having wheels, and a truck frame resiliently carried by said wheels, said mechanism comprising an annular rotatable friction braking element secured to rotate with one of said wheels, an annular non-rotatable friction braking element adapted to cooperate with said rotatable element to brake the wheel, adjustable means carried by said frame for normally supporting said non-rotatable element for movement with said frame and operative to permit movement of said non-rotatable element relative to said frame, a circular element associated concentrically with one of said wheels, a centralizing shoe disposed to engage said circular element, lever means associated with said non-rotatable element and connected to said shoe and operative upon movement in one direction to draw said shoe away from said circular element and operative upon movement in the opposite direction to effect movement of said shoe against said circular element and to then effect movement of said non-rotatable element vertically relative to said rotatable element into concentric relation with said rotatable element, and means for controlling the operation of said lever means.

13. A brake mechanism for a vehicle truck having wheels, and a truck frame resiliently carried by said wheels, said mechanism comprising an annular rotatable friction braking element secured to rotate with one of said wheels, an annular non-rotatable friction braking element adapted to cooperate with said rotatable element to brake the wheel, adjustable means carried by said frame for normally supporting said non-rotatable element for movement with said frame and operative to permit movement of said non-rotatable element relative to said frame, a circular element associated concentrically with one of said wheels, a centralizing shoe disposed above said circular element, a diametrically opposite shoe disposed below said circular element, oppositely disposed like lever means carried by said non-rotatable element and carrying said shoes and operative upon movement in one direction to draw said shoes away from said circular element and operative upon an intial movement in the opposite direction to move one of said shoes into engagement with said circular element and upon further movement to move the other of said shoes and said non-rotatable element relative to said rotatable element until said shoes engage each other for thereby centralizing said non-rotatable element with respect to said rotatable element.

14. A brake mechanism for a vehicle truck having wheels, a truck frame and spring means carried by said wheels and resiliently supporting said frame, said brake mechanism comprising an annular rotatable friction braking element secured to rotate with one of said wheels, an annular non-rotatable friction braking element adapted to cooperate with said rotatable element for braking said wheel, resilient means carried by said frame for supporting said non-rotatable element from said frame, a member associated with one of said wheels and fixed against vertical movement relative thereto, a shoe disposed below said member and operatively connected to said non-rotatable element, a like and oppositely disposed shoe disposed above said member and operatively connected to said non-rotatable element, said shoes being normally spaced from said member and being adapted to be moved into engagement with opposite portions of said member for centralizing said non-rotatable element with said rotatable element, means for moving said shoes to their normal position, lever means operatively connected to said shoes for moving same relative to said non-rotatable element into engagement with said member, and means for arresting movement of each of said shoes in the direction of said member in a predetermined position with respect to said non-rotatable element.

15. A brake mechanism for a vehicle truck having wheels, a truck frame and spring means carried by said wheels and resiliently supporting said frame, said brake mechanism comprising an annular rotatable friction braking element secured to rotate with one of said wheels, an annular non-rotatable friction braking element adapted to cooperate with said rotatable element for braking said wheel, resilient means carried by said frame for supporting said non-rotatable element from said frame, a member associated with one of said wheels and fixed against vertical movement relative thereto, a shoe disposed below said member, a link pivotally connecting said shoe and non-rotatable element, a like and oppositely disposed shoe and link, said shoes being normally disengaged from said member and being movable, upon rocking of said links, into engagement with said member and operative upon engagement with said member to centralize said non-rotatable element with said rotatable element, means for arresting movement of each of said shoes in the position centralizing said non-rotatable element with said rotatable element, and lever means operatively connected to said links for controlling the operation thereof.

16. A brake mechanism for a vehicle truck having wheels, a truck frame and spring means carried by said wheels and resiliently supporting said frame, said brake mechanism comprising an annular rotatable friction braking element secured to rotate with one of said wheels, an annular non-rotatable friction braking element adapted to cooperate with said rotatable element for braking said wheel, resilient means carried by said frame for supporting said non-rotatable element from said frame, a member associated with one of said wheels and fixed against vertical movement relative thereto, a shoe disposed below said member, a link pivotally connecting said shoe to said non-rotatable element adjacent the inner periphery thereof, a lever pivotally connected to said non-rotatable element adjacent the outer periphery thereof, another link pivotally connecting said lever and shoe, said lever upon movement in one direction being adapted to move the remote ends of said links apart for drawing said shoe in the direction of said non-rotatable element and upon movement in the opposite direction to force said shoe away from said non-rotatable element toward said member, a like and oppositely disposed shoe, lever and link arrangement above said member, means for operating said levers to draw said shoes toward said non-rotatable element, means for operating said levers to move said shoes in said opposite direction into engagement with said members, and means for limiting the extent of movement of each of said shoes relative to said non-rotatable element to substantially the same degree.

17. A brake mechanism for a vehicle truck having wheels, a truck frame and spring means carried by said wheels and resiliently supporting said frame, said brake mechanism comprising an annular rotatable friction braking element secured to rotate with one of said wheels, an annular non-rotatable friction braking element adapted to cooperate with said rotatable element for braking said wheel, resilient wheel, resilient means carried by said frame for supporting said non-rotatable element from said frame, a member associated with one of said wheels and fixed against vertical movement relative thereto, a shoe disposed below said member, a link pivotally connecting said shoe to said non-rotatable element adjacent the inner periphery thereof, a lever pivotally connected to said non-rotatable element adjacent the outer periphery thereof, another link pivotally connecting said lever and shoe, said lever upon movement in one direction being adapted to move the remote ends of said links apart for drawing said shoe in the direction of said non-rotatable element and upon movement in the opposite direction to force said shoe away from said non-rotatable element toward said member, a like and oppositely disposed shoe, lever and link arrangement above said member, means for operating said levers to draw said shoes toward said non-rotatable element, means for operating said levers to move said shoes in said opposite direction into engagement with said members, and means for limiting the extent of movement of each of said shoes relative to said non-rotatable element to substantially the same degree, said shoes, links and levers being so arranged that engagement of said shoes with each other centralizes said non-rotatable element with said rotatable element.

18. A brake mechanism for a vehicle truck having wheels, a truck frame and resilient means carried by said wheels and resiliently supporting said frame, said brake mechanism comprising an annular rotatable friction braking element disposed in concentric relation with one of said wheels and secured to said wheel for rotation therewith, an annular non-rotatable friction braking element resiliently carried by said frame and adapted to be moved into frictional engagement with said rotatable element for effecting braking thereof, a circular member secured to said wheel in concentric relation therewith, a shoe disposed below said member, an oppositely arranged shoe disposed above said member, lever means connecting said shoes to said non-rotatable element and operative to move said shoes in a direction toward each other relative to said non-rotatable element and into substantially engagement with said member, and means for limiting the movement of said shoes toward each other to a degree for effecting movement of said non-rotatable element into concentric relation with said rotatable element.

19. A brake mechanism for a vehicle truck having wheels, a truck frame and resilient means carried by said wheels and resiliently supporting said frame, said brake mechanism comprising an annular rotatable friction braking element disposed in concentric relation with one of said wheels and secured to said wheel for rotation therewith, an annular non-rotatable friction braking element resiliently carried by said frame and adapted to be moved into frictional engagement with said rotatable element for effecting braking thereof, a circular member secured to said wheel in concentric relation therewith, a shoe disposed below said member, an oppositely arranged shoe disposed above said member, the adjacent surfaces of said shoes being arcuate and formed with substantially the same radius as said circular member, lever means connecting said shoes to said non-rotatable element and operative to move said shoes relative to said non-rotatable element in a direction toward each other and into substantial engagement with said member, and means for limiting the movement of each of said shoes toward each other to a degree in which said arcuate surfaces are in substantial concentric relationship with the periphery said non-rotatable element.

20. A brake mechanism for a vehicle truck having wheels, a truck frame and resilient means carried by said wheels and resiliently supporting said frame, said brake mechanism comprising an annular rotatable friction braking element disposed in concentric relation with one of said wheels and secured to said wheel for rotation therewith, an annular non-rotatable friction braking element resiliently carried by said frame and adapted to be moved into frictional engagement with said rotatable element for effecting braking thereof, a circular member secured to said wheel in concentric relation therewith, a shoe disposed below said member, an oppositely arranged shoe disposed above said member, the adjacent surfaces of said shoes being substantially semi-circular in shape and formed with substantially the same radius as said circular element, lever means connecting said shoes to said non-rotatable element and operative to move said shoes relative to said non-rotatable element in a direction toward each other and into engagement with each other, and means for limiting the movement of each of said shoes toward each other to a degree in which the semi-circular surfaces of the shoes are in substantial concentric relationship with the periphery of said non-rotatable element.

21. A brake mechanism for a vehicle truck having wheels, a truck frame and spring means carried by said wheels and resiliently supporting said frame, said brake mechanism comprising an annular rotatable braking element secured to rotate with one of said wheels, an annular non-rotatable friction braking element resiliently carried by said frame, a circular member secured to one of said wheels in concentric relation therewith, mechanism associated with said non-rotatable element and adapted to cooperate with said circular member for moving said non-rotatable element relative to said rotatable element into substantial concentric relationship with said rotatable element, means for controlling the operation of the last named mechanism, and a brake cylinder device carried by said truck frame and operatively connected to said means for controlling the operation thereof and for moving said elements into frictional braking engagement.

22. A brake mechanism for a vehicle truck having wheels, a truck frame and spring means carried by said wheels and resiliently supporting said frame, said brake mechanism comprising an annular rotatable braking element secured to rotate with one of said wheels, an annular non-rotatable friction braking element resiliently carried by said frame, a circular member secured to one of said wheels in concentric relation therewith, centralizing mechanism including a lever disposed below said circular element and connected to said non-rotatable element and operative to effect movement of said non-rotatable element in one direction relative to said rotatable element into concentric relation with said rotatable element, said centralizing mechanism also including a like oppositely arranged lever disposed above said circular element and operative to effect movement of said non-rotatable element in the opposite direction relative to and into concentric relation with said rotatable element, a brake cylinder device mounted on said frame, and a brake lever having one end pivotally connected to said brake cylinder and the opposite end pivotally connected to the levers of said mechanism, said brake cylinder device being operative to effect operation of said brake lever for operating the levers of said mechanism for centralizing said non-rotatable element with said rotatable element and for then urging said non-rotatable element into frictional braking engagement with said rotatable element.

23. A brake mechanism for a wheel and axle assembly of a vehicle truck having a truck frame resiliently supported on said assembly, said brake mechanism comprising annular rotatable and non-rotatable friction braking elements encircling said axle and adapted to be moved into frictional engagement for braking said assembly, said rotatable element being directly secured to said axle for rotation therewith, a brake cylinder device secured to said frame, a bifurcated lever having the closed end thereof connected to said brake cylinder device and the opposite ends disposed one at either side of said axle, and means forming an operating connection between said opposite ends of said lever and diametrically opposite portions of said non-rotatable element, said brake cylinder device being operative by fluid under pressure to actuate said lever to move said non-rotatable element into frictional braking engagement with said rotatable element.

24. A brake mechanism for a wheel and axle assembly of a vehicle truck having a truck frame resiliently supported on said assembly, said brake mechanism comprising annular rotatable and non-rotatable friction braking elements encircling said axle and adapted to be moved into frictional engagement for braking said assembly, said rotatable element being directly secured to said axle for rotation therewith, resilient means for supporting said non-rotatable element from said frame, centralizing means cooperative with said axle for moving said non-rotatable element relative to and into concentric relation with said rotatable element, a brake cylinder device secured to said frame, and lever means connecting said brake cylinder device to said centralizing means and operative by said brake cylinder device to control the operation of said centralizing means and to effect movement of said elements into frictional braking engagement.

25. A brake mechanism for a wheel of a vehicle, comprising an annular, rotatable friction braking element secured to rotate with said wheel, an annular non-rotatable friction braking element, a brake lever having oppositely disposed spaced arms for moving said non-rotatable element into frictional braking engagement with said rotatable element, and means forming operating connections between the ends of said arms and diametrically opposite portions of said non-rotatable element comprising oppositely disposed substantially parallel links, means providing a pivotal connection between one end of each of said links and said non-rotatable element, and a rigid member providing a pivotal connection between the opposite ends of said links and the two arms of said levers and operative to hold said arms in a predetermined spaced relation.

26. A brake mechanism for a wheel of a vehicle comprising an annular, rotatable friction braking element secured to rotate with said wheel, an annular non-rotatable friction braking element, a rigid element disposed with its ends adjacent diametrically opposite top and bottom portions of said non-rotatable element, means forming an operating connection between the ends of said rigid element and said non-rotatable element comprising oppositely disposed links pivotally connected at one end to said rigid element and at the opposite end to said non-rotatable element whereby said non-rotatable element is capable of movement in a vertical direction relative to said rigid element, a brake lever having a pair of arms, a pin pivotally connecting one of said arms to one end of said rigid element, and another pin pivotally connecting the other of said arms to the other end of said rigid element, said pins being disposed in axial alignment with each other and with their axes extending in a substantially vertical direction.

27. A brake mechanism for a wheel of a vehicle comprising an annular, rotatable friction braking element secured to rotate with said wheel, an annular non-rotatable friction braking element, a rigid element disposed with its ends adjacent diametrically opposite top and bottom portions of said non-rotatable element, means forming an operating connection between the ends of said rigid element and said non-rotatable element comprising oppositely disposed links pivotally connected at one end to said rigid element and at the opposite end to said non-rotatable element whereby said non-rotatable element is capable of movement in a vertical direction relative to said rigid element, said rigid element having a shoulder engageable by one of said links for supporting said non-rotatable element, a brake lever having spaced arms, means providing axially aligned pivotal connections between the ends of said lever arms and the ends of said rigid element, and means for supporting said lever and rigid element and thereby said non-rotatable element.

28. A brake mechanism for a wheel of a vehicle comprising an annular, rotatable friction braking element secured to rotate with said wheel, an annular non-rotatable friction braking element, a rigid element disposed with its ends adjacent diametrically opposite top and bottom portions of said non-rotatable element, means forming an operating connection between the ends of said rigid element and said non-rotatable element comprising oppositely disposed links pivotly connected at one end to said rigid element and at the opposite end to said non-rotatable element whereby said non-rotatable element is capable of movement in a vertical direction relative to said rigid element, a brake lever having a pair of arms disposed one above the other adjacent top and bottom portions of said non-rotatable element, a rigid member extending between and connected to said arms adjacent the ends thereof for holding said arms in a predetermined spaced relation, and means connecting the ends of said arms to said portions of said non-rotatable element operative to permit movement of said non-rotatable element in a vertical direction relative to said arms.

29. A brake mechanism for a wheel of a vehicle comprising an annular rotatable friction braking disc secured to rotate with said wheel, an annular non-rotatable braking disc disposed adjacent each of the opposite faces of said rotatable disc, a brake cylinder, a pair of spaced levers having one end connected to said brake cylinder for operation thereby, the opposite end of one of said levers being operatively connected to one of said non-rotatable discs and the opposite end of the other lever being operatively connected to the other non-rotatable disc, and a link pivotally connected at one end to one of said levers intermediate its ends and pivotally connected at its opposite end to the other of said levers intermediate its ends whereby said brake cylinder device is operative to control movement of said non-rotatable discs into and out of frictional engagement with said rotatable disc.

30. A brake mechanism for a vehicle having wheels and a truck frame carried by said wheels, said mechanism comprising an annular rotatable friction braking disc secured to one of said wheels for rotation therewith, an annular, non-rotatable friction braking disc disposed adjacent each of the opposite faces of said rotatable disc, a brake cylinder device secured to said frame, a pair of levers connected at one end to said brake cylinder device, the opposite end of each of said levers being operatively connected to spaced portions of one of said non-rotatable discs, a link pivotally connecting said levers together intermediate their ends whereby operation of said brake cylinder device is adapted to control movement of said non-rotatable discs into and out of frictional engagement with said rotatable disc, and means associated with said brake cylinder device securing the adjacent ends of said levers against movement in a direction radially of said cylinder whereby said levers are operative to hold said non-rotatable discs aagainst turning with said rotatable disc.

31. A brake mechanism for a vehicle having wheels and a truck frame carried by said wheels, said mechanism comprising an annular rotatable friction braking disc secured to one of said wheels for rotation therewith, an annular, non-rotatable friction braking disc disposed adjacent each of the opposite faces of said rotatable disc, a brake cylinder device secured to said frame, a pair of levers connected at one end to said brake cylinder device, the opposite end of each of said levers being operatively connected to spaced portions of one of said non-rotatable discs, a link pivotally connecting said levers together intermediate their ends whereby operation of said brake cylinder device is adapted to control movement of said non-rotatable discs into and out of frictional engagement with said rotatable disc, said brake cylinder device having at each end a channel shaped portion in which the adjacent ends of said levers are disposed for holding said levers and thereby said non-rotatable discs against turning with said rotatable disc.

32. A brake mechanism for a vehicle having wheels and a truck frame resiliently carried by said wheels, said mechanism comprising annular rotatable and non-rotatable friction braking elements, said rotatable element being secured to rotate with one of said wheels, means carried by said frame for normally supporting said non-rotatable element for movement with said frame relative to said rotatable element and operative to permit movement of said non-rotatable element relative to said frame into concentric braking relation with said rotatable element, centralizing means for moving said non-rotatable element relative to said frame into concentric braking relation with said rotatable element, a member secured in concentric relation with said rotatable element, means associated with said non-rotatable element and adapted to cooperate with said member for defining said concentric relation, actuating means for moving said non-rotatable element into frictional engagement with said rotatable element to effect braking of said wheels, and brake cylinder means for operating said centralizing means and actuating means.

33. A brake mechanism for a vehicle truck having wheels, and a truck frame resiliently carried by said wheels, said mechanism comprising an annular rotatable friction braking element secured to rotate with one of said wheels, an annular non-rotatable friction braking element adapted to cooperate with said rotatable element to brake the wheel, means carried by said frame for normally supporting said non-rotatable element for movement with said frame and operative to permit movement of said non-rotatable element relative to said frame, a member secured in concentric relation with said rotatable element, centralizing means associated with said non-rotatable element and adapted to cooperate with said member for moving said non-rotatable element relative to and into concentric relation with said rotatable element and for holding said non-rotatable element in said relation, and fluid pressure means for actuating said centralizing means.

34. A brake mechanism for a vehicle truck having wheels, and a truck frame resiliently carried by said wheels, said mechanism comprising an annular rotatable friction braking element secured to rotate with one of said wheels, an annular non-rotatable friction braking element adapted to cooperate with said rotatable element to brake the wheel, means carried by said frame for normally supporting said non-rotatable element for movement with said frame and operative to permit movement of said non-rotatable element relative to said frame, a member secured in concentric relation with said rotatable element, centralizing means associated with said non-rotatable element and adapted to cooperate with said member for moving said non-rotatable element relative to and into concentric relation with said rotatable element, means for restraining further operation of said centralizing means upon said non-rotatable element obtaining said relation, and fluid pressure means for actuating said centralizing means.

35. A brake mechanism for a wheel of a vehicle truck having a frame carried by said wheel, said mechanism comprising an annular rotatable friction braking disc secured to rotate with said wheel, an annular non-rotatable braking disc disposed adjacent each of the opposite faces of said rotatable disc, a brake cylinder fixed to said frame, a pair of spaced levers, one end of one of said levers having a fixed fulcrum and the adjacent end of the other lever being connected to said brake cylinder for operation thereby, the opposite end of one of said levers being operatively connected to one of said non-rotatable discs and the opposite end of the other lever being operatively connected to the other non-rotatable disc, and a link pivotally connected at one end to one of said levers intermediate its ends and pivotally connected at its opposite end to the other of said levers intermediate its ends whereby said brake cylinder device is operative to control movement of said non-rotatable discs into and out of frictional engagement with said rotatable disc.

36. A brake mechanism for a vehicle having wheels and a truck frame resiliently carried by said wheels, said mechanism comprising annular rotatable and non-rotatable friction braking discs having annular braking surfaces adapted upon frictional interengagement to effect braking of at least one of said wheels, the rotatable disc being secured to rotate with the wheel to be braked, means adjustably supporting said non-rotatable disc for movement therewith relative to said rotatable disc, and means operative upon engagement of said discs to move said non-rotatable disc relative to said frame and rotatable disc for centralizing the braking surface on said non-rotatable disc with the braking surface on said rotatable disc.

37. A brake mechanism for a vehicle truck having a wheel and axle assembly and a truck frame resiliently supported on said assembly, said mechanism comprising an annular rotatable friction braking element secured to rotate with said assembly, a non-rotatable friction braking element adapted to be forced into braking engagement with said rotatable element for braking said assembly, means for normally supporting said non-rotatable element from said frame and operable to permit vertical movement of said non-rotatable element relative to said frame to a braking position with respect to said rotatable element, and means connected to said non-rotatable element and cooperative with said assembly for effecting vertical movement of said non-rotatable element relative to said frame to said braking position and for forcing said non-rotatable element into braking engagement with said rotatable element.

38. A brake mechanism for a vehicle truck having a wheel and axle assembly and a truck frame resiliently supported on said assembly, said mechanism comprising an annular rotatable friction braking element secured to rotate with said assembly, a non-rotatable friction braking element adapted to be forced into braking engagement with said rotatable element for braking said assembly, means for normally supporting said non-rotatable element from said frame and operable to permit movement of said non-rotatable element relative to said frame to a braking position with respect to said rotatable element, centralizing means connected to said non-rotatable element and cooperative with said assembly for moving said non-rotatable element relative to said frame to said braking position, and means controlled by said centralizing means and operative subsequent to movement of said non-rotatable element to said braking position to force said non-rotatable element into braking engagement with said rotatable element.

39. A brake mechanism for a vehicle truck having a wheel and axle assembly and a truck frame resiliently supported on said assembly, said mechanism comprising an annular rotatable friction braking element secured to rotate with said assembly, a non-rotatable friction braking element adapted to be forced into braking engagement with said rotatable element for braking said assembly, means for normally supporting said non-rotatable element from said frame and operable to permit movement of said non-rotatable element relative to said frame to a braking position with respect to said rotatable element, braking means for forcing said non-rotatable element against said rotatable element to effect braking thereof, and centralizing means connected to said non-rotatable element for effecting movement thereof relative to said frame into concentric relation with said rotatable element and cooperative with said assembly to define said relation and cooperative with said braking means to delay the operation of said braking means until after the operation of said centralizing means.

CLYDE C. FARMER.